US012649222B2

(12) United States Patent
Arich

(10) Patent No.: US 12,649,222 B2
(45) Date of Patent: Jun. 9, 2026

(54) POWER TOOL

(71) Applicant: Black & Decker Inc., New Britain, CT (US)

(72) Inventor: Klaus-Dieter Arich, Hunstetten-Beuerbach (DE)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 18/065,292

(22) Filed: Dec. 13, 2022

(65) Prior Publication Data

US 2023/0118960 A1 Apr. 20, 2023

Related U.S. Application Data

(63) Continuation of application No. PCT/EP2021/066898, filed on Jun. 22, 2021.

(51) Int. Cl.
*B25D 16/00* (2006.01)
*B25D 11/06* (2006.01)

(52) U.S. Cl.
CPC .......... *B25D 16/006* (2013.01); *B25D 11/062* (2013.01); *B25D 2211/003* (2013.01);
(Continued)

(58) Field of Classification Search
CPC ................ B25D 16/006; B25D 11/062; B25D 2211/003; B25D 2216/0023;
(Continued)

(56) References Cited

U.S. PATENT DOCUMENTS 1,984,256 A * 12/1934 Dederer ............... B25D 11/102 173/101
2,016,829 A * 10/1935 Dederer ............... B25D 16/006 173/205

(Continued)

FOREIGN PATENT DOCUMENTS

CN 100415453 C * 9/2008 ........... B25D 16/006
CN 110405698 A * 11/2019 ................ B25F 5/00

(Continued)

OTHER PUBLICATIONS

Written Opinion of the ISA, dated Dec. 20, 2021, in corresponding PCT Application No. PCT/EP2021/066898.

*Primary Examiner* — Robert F Long
(74) *Attorney, Agent, or Firm* — Rhonda L. Barton

(57) ABSTRACT

A power tool comprises a housing and a motor having a drive shaft. An output shaft is connectable to a tool. A mode selection mechanism is couplable between the drive shaft and the output shaft and arranged to transmit drive therebetween. The mode selection mechanism is moveable between a first position in which the power tool operates in a first mode and a second position in which the power tool operates in a second mode. A mode selection actuator is mounted on the housing and arranged to select at least the first position and the second position of the mode selection mechanism. An actuating rod is coupled between the mode selection mechanism and an engaging portion of the mode selection actuator. The engaging portion and rod are moveable in a direction along a longitudinal axis of the rod when the mode selection mechanism moves between the first and second positions.

21 Claims, 11 Drawing Sheets

(52) U.S. Cl.
CPC ................ *B25D 2216/0023* (2013.01); *B25D 2216/0038* (2013.01); *B25D 2216/0084* (2013.01)

(58) Field of Classification Search
CPC .... B25D 2216/0038; B25D 2216/0084; B25D 2216/0015; B25F 5/001
USPC ..... 173/1–2, 13, 18–20, 184, 29–31, 38–39, 173/45–53
See application file for complete search history.

(56) References Cited

U.S. PATENT DOCUMENTS 3,221,192 A * 11/1965 Franklin ................. H02P 7/295 388/918
3,802,698 A * 4/1974 Burian ................... A61B 5/222 482/8
3,835,715 A * 9/1974 Howell ................ B25D 11/106 173/48
4,105,084 A * 8/1978 Baak ..................... B62B 5/0026 180/21
4,220,111 A * 9/1980 Krautkremer .......... B63H 25/02 114/144 R
4,418,766 A * 12/1983 Grossmann ........... B23B 45/008 173/13
4,428,438 A * 1/1984 Holzer .................... B25B 21/00 173/48
4,978,877 A * 12/1990 Quirijnen ............... H02K 23/18 310/239
5,145,475 A * 9/1992 Cares ................... A63B 21/157 482/52
5,842,527 A * 12/1998 Arakawa .............. B25D 16/006 173/104
6,508,313 B1 * 1/2003 Carney ............... B25B 23/1475 173/171
6,868,919 B1 * 3/2005 Manschitz ........... B25D 16/006 335/205
6,939,262 B1 * 9/2005 Yu ....................... F16H 37/0833 74/354
7,070,036 B2 * 7/2006 Fernandez ............. B60K 17/28 192/109 R
7,174,969 B2 * 2/2007 Droste ................. B25D 16/006 173/48
7,331,496 B2 * 2/2008 Britz .................... B25D 16/006 74/22 A
7,404,341 B2 * 7/2008 Nishino .................. F16H 47/02 74/606 R
8,267,924 B2 * 9/2012 Zemlok ............ A61B 17/00234 606/1
9,039,557 B2 * 5/2015 Naughton ........... B05C 17/0103 221/229
9,873,192 B2 * 1/2018 Lauterwald ............ B25D 11/04
10,052,733 B2 * 8/2018 Ely ......................... B25B 23/18
10,418,879 B2 * 9/2019 Bartoszek .............. H02K 7/145
2002/0023763 A1 * 2/2002 Thurler .................. B25D 16/00 173/48
2003/0079562 A1 * 5/2003 Schaible .............. B25D 16/006 74/473.37
2003/0196824 A1 * 10/2003 Gass ..................... B23B 45/008 173/131
2005/0224262 A1 * 10/2005 Ima ........................ B60K 17/22 180/53.6
2005/0257385 A1 * 11/2005 Walker ................... B23D 49/16 30/392
2006/0060365 A1 * 3/2006 Kunz ..................... H01H 13/08 173/217
2006/0096767 A1 * 5/2006 Miller ..................... B25B 21/00 173/176
2007/0068692 A1 * 3/2007 Puzio ................... B25D 16/006 173/217
2007/0119269 A1 * 5/2007 Anjanappa .......... B25B 23/1425 73/862.21
2008/0017396 A1 * 1/2008 Kristen ................ B25D 16/006 173/162.2
2009/0008111 A1 * 1/2009 Liebert ................ B25D 16/006 173/217
2009/0056965 A1 * 3/2009 Moessnang .......... B25D 16/006 173/18
2009/0126955 A1 * 5/2009 Trautner .............. B25D 11/106 173/104
2009/0200053 A1 * 8/2009 Scrimshaw ........... B23B 31/123 173/47
2010/0108337 A1 * 5/2010 Norona ................. B23B 45/008 173/1
2011/0030980 A1 * 2/2011 Ho ........................ B23B 45/008 173/176
2011/0147021 A1 * 6/2011 Schaal .................... B25F 5/001 173/47
2011/0152029 A1 * 6/2011 Rudolph ................. B25B 21/02 475/331
2012/0175142 A1 * 7/2012 Van Der Linde ....... B25F 5/001 173/48
2013/0126202 A1 * 5/2013 Oomori ................... B25B 21/00 173/217
2013/0331994 A1 * 12/2013 Ng ......................... G05B 15/02 700/275
2014/0284070 A1 * 9/2014 Ng ............................ B25F 5/00 173/2
2014/0309666 A1 * 10/2014 Shelton, IV ......... A61B 17/115 606/139
2014/0367134 A1 * 12/2014 Phillips ................. B25B 23/147 173/176
2015/0122063 A1 * 5/2015 Elger ..................... B23Q 5/142 74/325
2015/0158169 A1 * 6/2015 Lauterwald .......... B25D 16/006 173/48
2015/0173755 A1 * 6/2015 Baxter, III ....... A61B 17/07207 227/180.1
2016/0023344 A1 * 1/2016 Bernhart ................... B25F 5/02 74/813 L
2016/0052118 A1 * 2/2016 Rudolph ................. B25B 21/00 173/48
2016/0129578 A1 * 5/2016 Sprenger ................. B25F 5/001 173/1
2016/0249945 A1 * 9/2016 Shelton, IV ......... A61B 17/115 606/171
2016/0354913 A1 * 12/2016 Madineni ............. H02K 11/215
2018/0056781 A1 * 3/2018 Lammers ............... B60K 25/06
2018/0056782 A1 * 3/2018 Lammers .................. F16H 3/54
2018/0085906 A1 * 3/2018 Nitsch .................. B25D 16/006
2018/0222484 A1 * 8/2018 Shively ..................... B60K 5/08
2018/0354114 A1 * 12/2018 Bantle ...................... B25B 21/02
2019/0125608 A1 * 5/2019 Bush .................... A61H 1/0255
2019/0353245 A1 * 11/2019 Kelleher ............... B23B 45/008
2020/0078918 A1 * 3/2020 Yoshikane .............. B25F 5/026
2020/0197119 A1 * 6/2020 Zergiebel ............... A61B 34/74
2020/0346337 A1 * 11/2020 Keller .................. B25D 16/006
2021/0045740 A1 * 2/2021 Nicholas ................ A61B 17/10
2021/0267596 A1 * 9/2021 Fanelli ............... A61B 17/0644
2022/0079586 A1 * 3/2022 Shelton, IV ......... A61B 17/068
2022/0190687 A1 * 6/2022 Fukuoka ................. B25B 23/18
2022/0314411 A1 * 10/2022 Kamiya ............... B25D 16/006
2022/0395971 A1 * 12/2022 Iida ...................... B25D 17/043
2023/0104060 A1 * 4/2023 Voth ...................... A01D 69/002 74/11
2023/0286126 A1 * 9/2023 Wang ..................... B23D 51/16
2023/0415323 A1 * 12/2023 Ichikawa ............... B25D 17/24
2024/0000452 A1 * 1/2024 Du ................... A61B 17/07207
2024/0308034 A1 * 9/2024 Kamiya ................ B25B 21/026
2025/0236005 A1 * 7/2025 LaValley ................. B25F 5/001
2025/0268595 A1 * 8/2025 Nicholas ............ A61B 17/0686
2025/0313084 A1 * 10/2025 Natarajan .............. B60K 17/02

FOREIGN PATENT DOCUMENTS

DE 102012212417 A1 * 2/2014 ........... B25D 16/006
DE 102012212417 B4 6/2017
DE 112019004233 T5 * 5/2021 ............ H01H 13/08
EP 1157788 A2 * 11/2001 ............. B25D 16/00

(56) References Cited

FOREIGN PATENT DOCUMENTS

| | | | | | |
|---|---|---|---|---|---|
| EP | 1832393 | A2 | * | 9/2007 | ........... B25D 16/006 |
| EP | 1157788 | B1 | | 12/2008 | |
| EP | 2168724 | A1 | * | 3/2010 | ............. B25B 21/00 |
| EP | 2062693 | B1 | | 2/2012 | |
| EP | 2767367 | A1 | * | 8/2014 | ........... B25D 11/062 |
| JP | 2016129911 | A | * | 7/2016 | ........... B25D 16/006 |
| WO | WO-2017002517 | A1 | * | 1/2017 | ........... B25D 16/006 |

* cited by examiner

POWER TOOL

CROSS-REFERENCE TO RELATED APPLICATIONS

This application is a continuation application of PCT Application No. PCT/EP2021/066898, having an international filing date of Jun. 22, 2021, which claims priority to and benefit of UK Patent Application No. 2009631.9, filed Jun. 24, 2020. The entireties of each are incorporated herein by reference.

FIELD OF THE INVENTION

The present invention relates to a power tool. In particular, the present invention relates to a drill with a mode selection mechanism.

BACKGROUND OF THE INVENTION

Power tools such as drills can have multiple modes of operation and a user can select the mode of operation in dependence of the type of task in hand. Some known drills can either operate in a drill mode whereby the motor of the drill causes rotation of an output shaft or in a hammer mode or drill-hammer mode whereby a hammer assembly reciprocates and impacts on the output shaft. This means that the user can user a drill to create holes in workpieces of a variety of different materials.

One known rotary hammer drill is shown in EP 1 157 788. The rotary hammer drill comprises a mode change mechanism for changing the operation of the rotary hammer drill between a rotary drive mode, hammer only mode and a rotary hammer mode. The user can select the different modes of operation by twisting a selection knob mounted on the side of the housing. The selection knob comprises an eccentric pin projecting into a slot of a mode change member. When the selection knob is rotated, the eccentric pin slides within the slot.

A problem with the rotary hammer drill shown in EP 1 157 788 is that the selection knob projects out from the side of the housing of the rotary hammer drill. This means that when the rotary hammer drill is placed on its side, the selection knob will impact the ground. This can cause wear or damage to the on the selection knob. Furthermore, the arrangement of the eccentric pin and the slot in the mode change member increases the width of the rotary hammer drill. This means that the selection knob can catch on other objects in tight spaces an even be accidentally adjusted between operation modes.

Examples of the present invention aim to address the aforementioned problems.

BRIEF SUMMARY OF THE INVENTION

According to an aspect of the disclosure there is a power tool comprising: a motor having a drive shaft, the motor being mounted in a housing; an output shaft connectable to a tool; and a mode selection mechanism couplable between the drive shaft and the output shaft and arranged to transmit drive therebetween wherein the mode selection mechanism is moveable between at least a first position in which the power tool operates in a first operation mode and a second position in which the power tool operates in a second operation mode; a mode selection actuator mounted on the housing arranged to select at least the first position and the second position of the mode selection mechanism; and an actuating rod coupled between the mode selection mechanism and an engaging portion of the mode selection actuator wherein the engaging portion and actuating rod are moveable in a direction along a longitudinal axis of the actuating rod when the mode selection mechanism moves between the first position and the second position.

Optionally, the engaging portion is a projecting tab arranged to engage an end surface of the actuating rod.

Optionally, the longitudinal axis of the actuating rod is substantially parallel to a longitudinal axis of the output shaft.

Optionally, the mode selection mechanism comprises a gear drive shaft arranged to transmit rotation from the drive shaft to the output shaft.

Optionally, the gear drive shaft comprises a first gear engageable with an output shaft gear and a second gear engageable with a drive shaft gear.

Optionally, mode selection mechanism comprises a rotatable sleeve mounted on the gear drive shaft and selectively couplable to the gear drive shaft.

Optionally, the mode selection mechanism comprises an engaging collar moveable between a first position wherein the engaging collar is engaged with the gear drive shaft and the rotatable sleeve and a second position wherein the engaging collar rotates with respect to the gear drive shaft or the rotatable sleeve.

Optionally, the gear drive shaft and/or the rotatable sleeve comprise splines engageable with reciprocal splines on the engaging collar.

Optionally, the mode selection mechanism comprises a sliding arm connected to the engaging collar and slidably engageable with the actuating rod.

Optionally, the sliding arm and the engaging collar are moveable in a direction substantially parallel to a longitudinal axis of the output shaft when the mode selection mechanism moves between the first position and the second position.

Optionally, the actuating rod is moveable in a direction substantially parallel to a longitudinal axis of the gear drive shaft when the mode selection mechanism moves between the first position and the second position.

Optionally, the actuating rod is biased towards a position where the mode selection mechanism is in the second position.

Optionally, the power tool comprises a reciprocating hammer arranged to strike a surface of the output shaft wherein the reciprocating hammer is driven by the rotating sleeve.

Optionally, the power tool is a hammer drill and the first operation mode is a drill only mode and the second operation mode is a hammer-drill mode.

Optionally, the mode selection mechanism is moveable to a third position in which the power tool operates in a third operation mode.

Optionally, the power tool is a hammer drill and the third operation mode is a hammer only mode.

Optionally, the mode selection actuator is a pivotable lever, a rotatable knob or a button.

Optionally, the mode selection actuator comprises at least one spring biased detent engageable with at least one recess on the housing.

Optionally, the housing comprises a first recess and a second recess respectively corresponding to the position of the mode selection actuator when the mode selection mechanism is in the first position and in the second position.

In another aspect of the disclosure there is provided a mode selection assembly for a power tool comprising: a mode selection mechanism couplable between a drive shaft of a motor and an output shaft connectable to a tool and the mode selection mechanism is arranged to transmit drive between the drive shaft and the output shaft wherein the mode selection mechanism is moveable between at least a first position in which the power tool operates in a first operation mode and a second position in which the power tool operates in a second operation mode; a mode selection actuator mountable on a housing of the power tool arranged to select at least the first position and the second position of the selectable gear mechanism; and an actuating rod coupled between the mode selection mechanism and an engaging portion of the mode selection actuator wherein the engaging portion and actuating rod are moveable in a direction along a longitudinal axis of the actuating rod when the mode selection mechanism moves between the first position and the second position.

In another aspect of the disclosure there is provided a power tool comprising: a motor having a drive shaft, the motor being mounted in a housing; an output shaft connectable to a tool; and a mode selection mechanism couplable between the drive shaft and the output shaft and arranged to transmit drive therebetween wherein the mode selection mechanism is moveable between at least a first position in which the power tool operates in a first operation mode and a second position in which the power tool operates in a second operation mode; an actuating rod having a first end coupled to the mode selection mechanism wherein the actuating rod is moveable in a direction along a longitudinal axis of the actuating rod when the mode selection mechanism moves between the first position and the second position; wherein a second end of the actuating rod projects into a recess in the housing arranged to receive a mode selection actuator and the second end of the actuating rod is engageable with an engaging portion of the mode selection actuator when the mode selection mechanism moves between the first position and the second position.

Optionally, the recess is arranged to receive one of a plurality of different shaped mode selection actuators.

BRIEF DESCRIPTION OF THE DRAWINGS

Various other aspects and further examples are also described in the following detailed description and in the attached claims with reference to the accompanying drawings, in which:

DETAILED DESCRIPTION OF THE INVENTION

Figure 1:
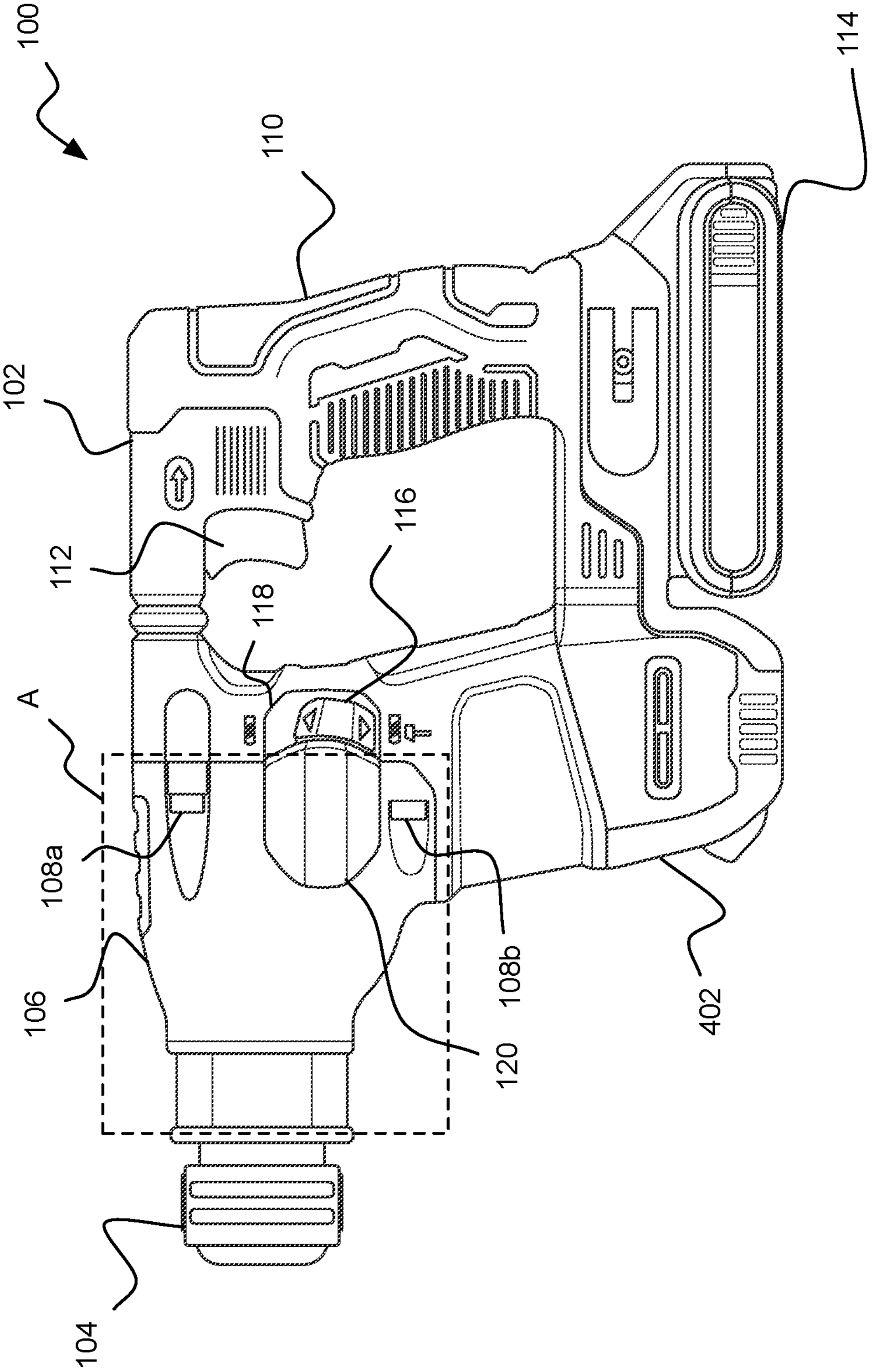
FIG. 1 shows a side view of a power tool according to an example.

FIG. 1 shows a side view of a power tool 100. The power tool 100 as shown in FIG. 1 is a hammer drill 100. Hereinafter, the power tool 100 will be referred to as a hammer drill 100, but in other examples any other type of power tool can be used such as a plunge saw, a drill, a multitool, or an oscillating or any other power tool which comprises a mode selection mechanism.

The hammer drill 100 comprises a housing 102. The housing 102 comprises a clam shell type construction having two halves which are fastened together. The halves of the housing 102 are fastened together with screws but in alternative examples any suitable means for fastening the housing 102 together may be used such as glue, clips, bolts and so on. For the purposes of clarity, the fastenings in the housing 102 are not shown in FIG. 1.

Figure 4:
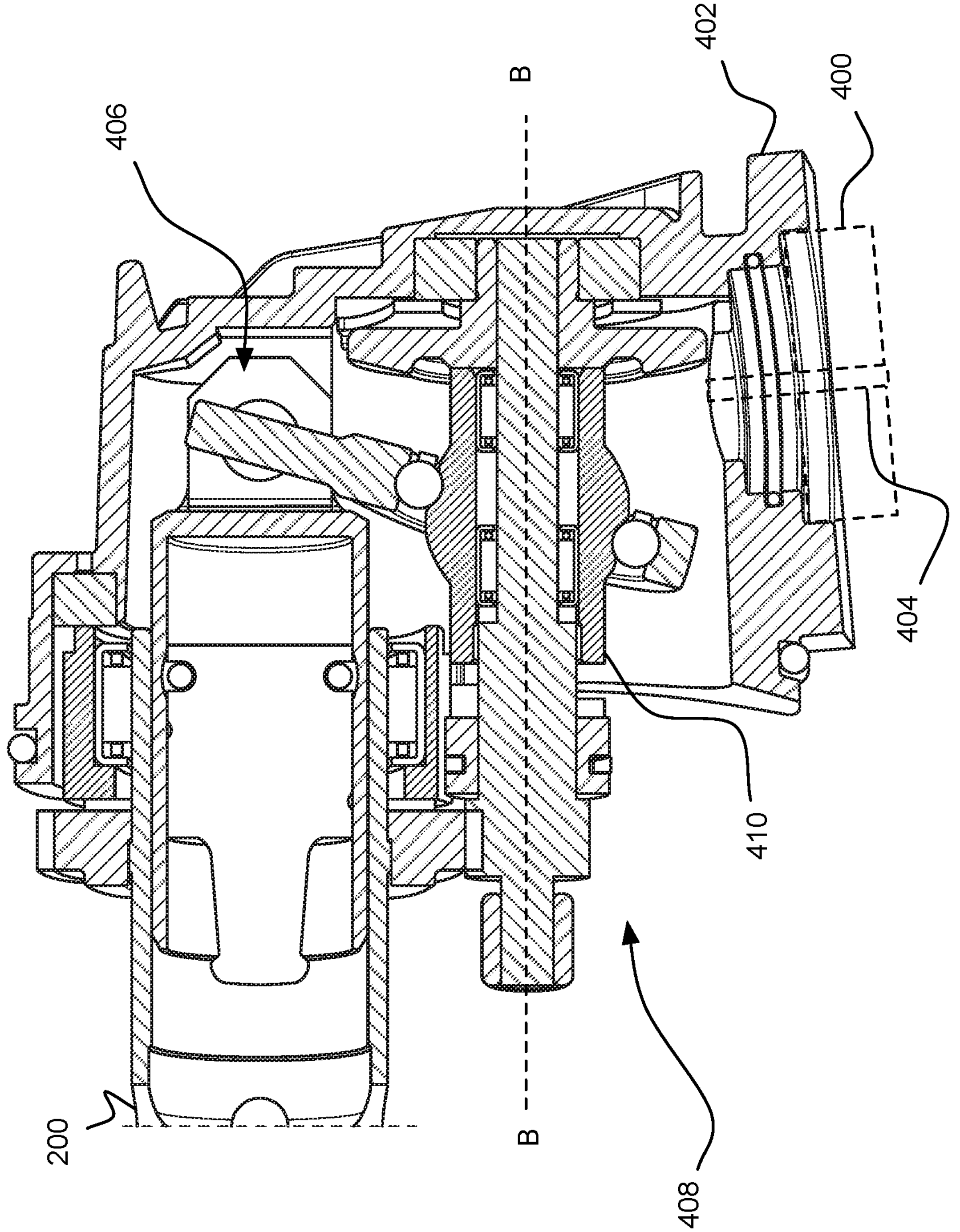
FIG. 4 shows a partial side cross-sectional view of a power tool according to an example in a first mode of operation.

An electric motor 400 is mounted in a motor housing portion 402 of the housing 102. The electric motor 400 is schematically represented in FIG. 4 and represented by a dotted line. FIG. 4 shows a partial side cross-sectional view of the hammer drill 100 according to an example in a first mode of operation. The cross-sectional view shown in FIG. 4 is located in the dotted box A shown in FIG. 1.

The electric motor 400 drives a motor drive shaft 404 and the electric motor 400 is arranged to drive an output shaft 200. In some examples the motor drive shaft 404 is approximately perpendicular to the output shaft 200. In other examples (not shown), the motor drive shaft 404 is substantially parallel to the output shaft 200. The output shaft 200 is connected to a tool holder 104 for receiving and holding a tool (not shown) such as a cutting tool (not shown) or a screwdriver bit (not shown).

Turning back to FIG. 1, the housing 102 comprises a gear housing portion 106. The gear housing portion 106 is optionally removably mountable to the housing 102. The gear housing portion 106 is fastened together with screws 108*a*, 108*b* but in alternative examples any suitable means for fastening the gear housing portion 106 to the housing 102 may be used such as glue, clips, bolts and so on.

A hammer mechanism 406 (as best shown in FIG. 4) is mounted in the gear housing portion 106. The hammer mechanism 406 is arranged to impart axial impacts onto the tool held in the tool holder 104 and the output shaft 200. A rotary drive mechanism 408 (again best shown in FIG. 4) is arranged to rotationally drive the output shaft 200 and the tool.

As shown in FIG. 1, the housing 102 comprises a handle 110 for the user to grip during use. A trigger button 112 is mounted on the handle 110 which is used by the user to activate the electric motor 400. The electric motor 400 is electrically connected to a battery pack 114. The battery pack 114 is removably mountable to the housing 102 at the base of the handle 110. In some examples, the battery pack 114 is integral to the housing 102 and not removeable.

Alternatively, in other examples the hammer drill 100 is powered additionally or alternatively with mains power (not shown).

A mode selection actuator 116 is mounted on the side of the housing 102. In some examples, the mode selection actuator 116 is mounted on the side of the gear housing portion 106. In some other examples, the mode selection actuator 116 is mounted on the side of the motor housing portion 402 or another location on the housing 102. A selection actuator 116 is moveable into a plurality of actuator positions, each actuator position respectively corresponding to a different mode of operation of the hammer drill 100.

In some examples and as shown in FIG. 1, the mode selection actuator 116 is moveable between a first actuator position and a second actuator position. The mode selection actuator 116 as shown in FIG. 1 is in the second actuator position. In some examples, the first actuator position corresponds to the hammer drill 100 operating in drill only mode and the second actuator position corresponds to a combined hammer-drill mode.

In the drill only mode, the rotary drive mechanism 408 is transmitting rotary drive from the motor drive shaft 404 to the output shaft 200. In the hammer-drill mode, the rotary drive mechanism 408 is transmitting rotary drive from the motor drive shaft 404 to the output shaft 200 and the hammer mechanism 406 is imparting axial impacts onto the tool held in the tool holder 104 and the output shaft 200. The rotary drive mechanism 408 and the hammer mechanism 406 will be discussed in more detail below.

In some other examples, the mode selection actuator 116 is moveable between more than two actuator positions e.g. three, four or more different actuator positions. Each different actuator position of the mode selection actuator 116 corresponds to a different mode of operation of the hammer drill 100. An example of a hammer drill 100 comprising three different operation modes comprising a first mode e.g. a drill only mode, a second mode e.g. a hammer-drill mode and a third mode e.g. a hammer only mode. Examples of the hammer drill 100 having three modes of operation will be discussed below in reference to FIGS. 9 to 11.

The mode selection actuator 116 is pivotable between the first actuator position and the second actuator position. The mode selection actuator 116 is mounted within a recess 118 on the housing 102. The housing 102 optionally comprises an actuator cover 120 which covers a portion of the recess 118 and the mode selection actuator 116. The actuator cover 120 covers part the mode selection actuator 116 and another part of mode selection actuator 116 remains accessible to the user so that the mode selection actuator 116 can be manually adjusted. In some examples, the actuator cover 120 projects in a sideways direction from the housing 102 a greater distance than the mode selection actuator 116. This means that the actuator cover 120 will abut an external surface or object before the mode selection actuator 116. Accordingly, the mode selection actuator 116 is less likely to be accidentally adjusted when used in tight spaces.

As mentioned above, the mode selection actuator 116 as shown in FIG. 1 is pivotable between the first and second actuator positions. However, in other examples, the mode selection actuator 116 is moveable between the first and second actuator positions with any type of movement. For example, the mode selection actuator 116 can be slidable along a linear path on the surface of the housing 102 or a depressible button (not shown) which moves into the housing 102. In yet further examples, the mode selection actuator 116 can be a rotatable knob 800 (best shown in FIG. 8).

Figure 2:
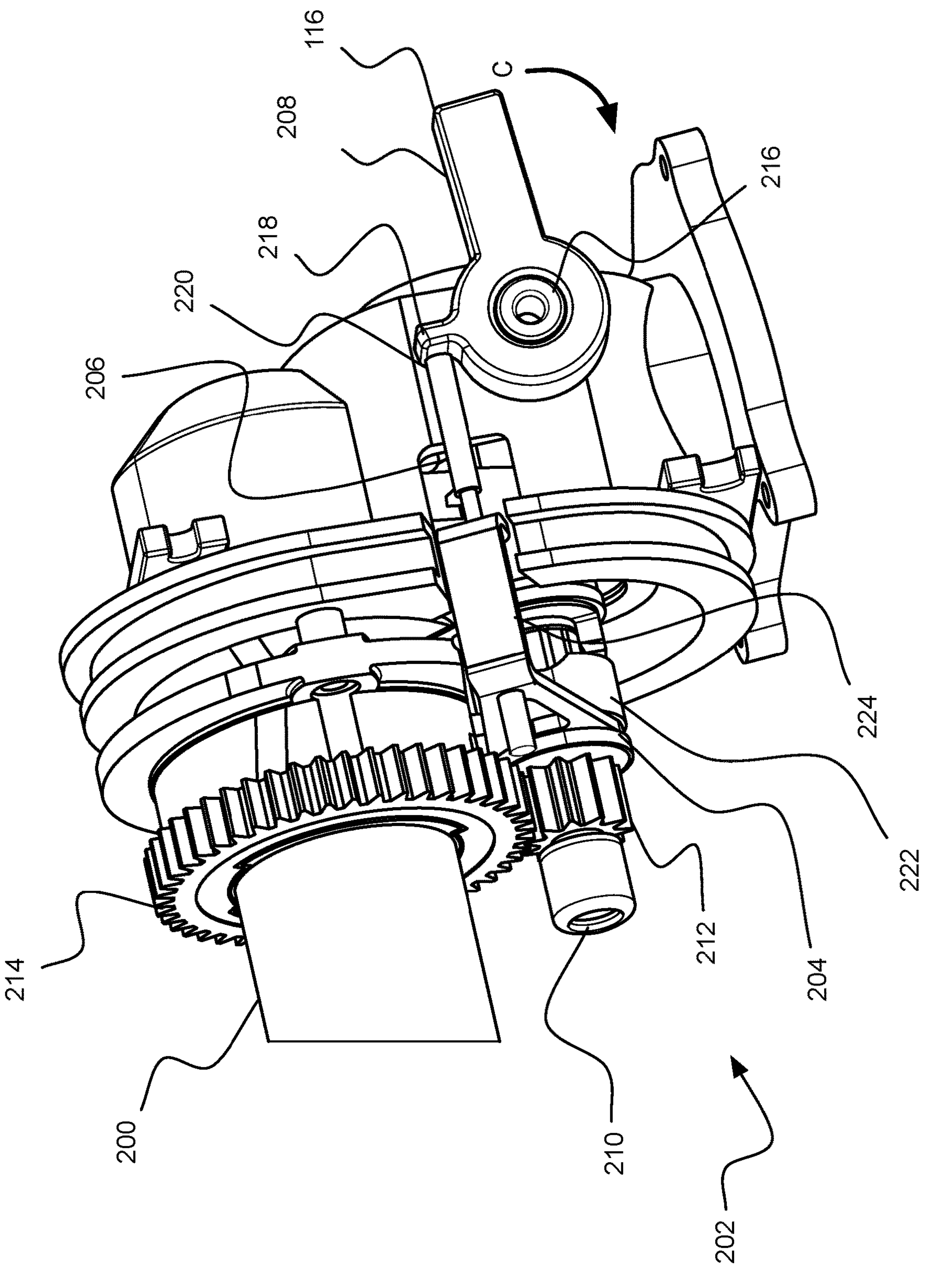
FIG. 2 shows a partial perspective view of a power tool according to an example in a first mode of operation.

Turning to FIG. 2, a mode selection assembly 202 will now be discussed in further detail. FIG. 2 shows a partial perspective view of the hammer drill 100 according to an example in a first mode of operation. The mode selection assembly 202 is mounted within the gear housing portion 106. For the purposes of clarity, the gear housing portion 106 is not shown in FIG. 2.

Figure 7A:
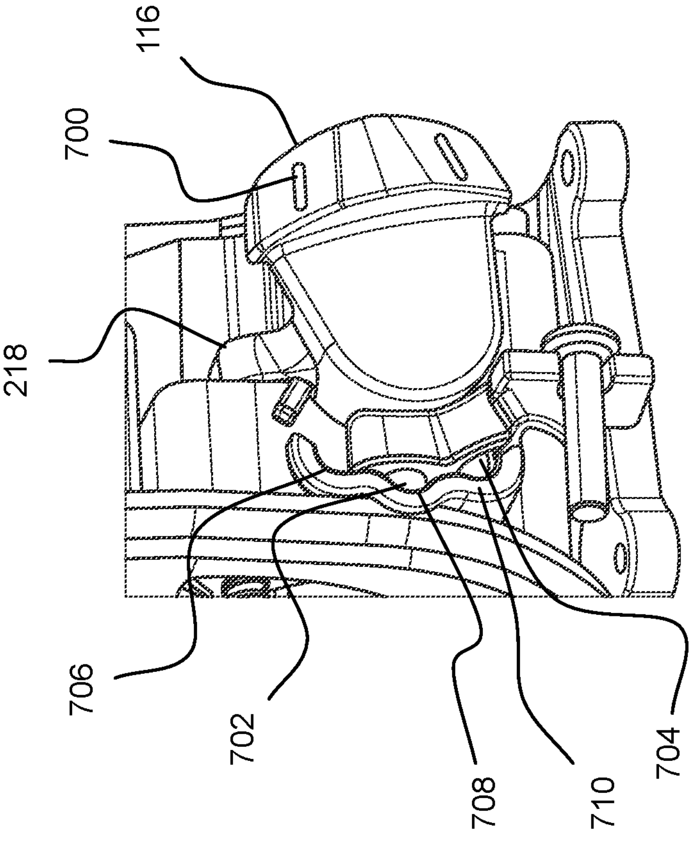
FIGS. 7*a* and 7*b* show a partial perspective view of a mode selection actuator respectively in the first and second modes of operation.

The mode selection assembly 202 is arranged to allow the user to select the mode of operation of the hammer drill 100. The mode selection assembly 202 comprises a mode selection mechanism 204, the mode selection actuator 116 and an actuating rod 206. The mode selection actuator 116 as shown in FIG. 2 is a pivotable lever with a lever arm 208 which projects into the recess 118 as mentioned above. The lever arm 208 can comprise any suitable form or material to aid the user moving the mode selection actuator 116 between the first and second actuator positions. For example, the mode selection actuator 116 can comprises a rubber or silicone coating for increasing grip. The mode selection actuator 116 can optionally comprises ridges 700 (as shown in FIG. 7*a*) or grooves (not shown) for further increasing grip.

The mode selection mechanism 204 is coupled between the motor drive shaft 404 of the electric motor 400 and the output shaft 200. The mode selection mechanism 204 is arranged to transmit drive between the motor drive shaft 404 and the output shaft 200. In some examples, the mode selection assembly 202 is coupled to a gear drive shaft 210 arranged to transmit rotation from the motor drive shaft 404 to the output shaft 200. In some examples, there is a single gear drive shaft 210, however in other examples there is a gearbox comprising a plurality of gears and gear drive shafts (not shown) for transmitting rotary drive from the motor drive shaft 404 and the output shaft 200.

As mentioned previously, the motor drive shaft 404 of the electric motor 400 is orientated perpendicular to the output shaft 200. In some examples, a pair of bevel gears (not shown) with rotational axes arranged perpendicular to each other can be provided to transfer the drive from the motor drive shaft 404 to the gear drive shaft 210. In some preferred examples the angle between the motor drive shaft 404 and the gear drive shaft is 95 degrees. In some other examples, the angle between the motor drive shaft 404 and the gear drive shaft can be any other suitable angle.

A first gear 212 is mounted on the gear drive shaft 210 and the first gear 212 meshes with a second gear 214 mounted on the output shaft 200. Accordingly, when the gear drive shaft 210 is rotated by the motor drive shaft 404, the first gear 212 causes rotation of the output shaft 200. In the example shown in FIG. 2, the first gear 212 and the second gear 214 are always coupled to each other. This means that the gear drive shaft 210 is always transmitting rotational drive to the output shaft 200. In other alternative examples, the rotary drive is selectively transmitted between the output shaft 200 and the gear drive shaft 210. In this way, the first gear 212 and the second gear 214 can be engaged and disengaged by the user. An example of this is discussed in more detail with respect to FIGS. 9 to 11.

The mode selection actuator 116 comprises an engaging portion 218 which is arranged to engage an end 220 of the actuating rod 206. In some examples, the engaging portion 218 is a projecting tab 218 which engages the surface of the end 220 of the actuating rod 206. In this way, the projecting tab 218 can push and/or pull the actuating rod 206 when the mode selection actuator 116 moves between the first and second actuator positions.

The actuating rod 206 is connected to a sliding arm 224. The sliding arm 224 is connected to an engaging collar 222.

The engaging collar 222 is seated in an aperture 608 (best shown in FIG. 6) and the engaging collar 222 can rotate with respect to the sliding arm 224. The engaging collar 222 is slidable between a first position in which the hammer drill 100 operates in a first operation mode and a second position in which the hammer drill 100 operates in a second operation mode. In some alternative examples, the actuating rod 206 is optionally connected directly to the engaging collar 222 without the intermediary the sliding arm 224.

The engaging collar 222 is arranged to couple the gear drive shaft 210 and a rotating sleeve 410 (best shown in FIG. 4). FIG. 2 shows the engaging collar 222 not in engagement with the rotating sleeve 410 and no rotary drive is transmitted between the gear drive shaft 210 and the rotating sleeve 410.

When the engaging collar 222 is coupled between the gear drive shaft 210 and the rotating sleeve 410, rotary drive is transmitted to the hammer mechanism 406. The coupling of the engaging collar 222 and the gear drive shaft 210 and the rotating sleeve 410 will be discussed below in more detail.

In order to for the user to change the mode of operation of the hammer drill 100, the user pivots the mode selection actuator 116 between the first and second actuator positions. The user pivots the mode selection actuator 116 in a clockwise direction C shown by the arrow shown in FIG. 2. In some examples, the mode selection actuator 116 pivots about the pivot point 216 between 20° to 30°. This is advantageous because the extent of the rotational movement of the mode selection actuator 116 causes the projecting tab 218 to move in a direction along the longitudinal axis of the actuating rod 206 throughout the full range of movement of the projecting tab 218. When the mode selection actuator 116 is in the first actuator position, the hammer drill 100 is in the first mode of operation e.g. a drill only mode of operation.

Figure 3:
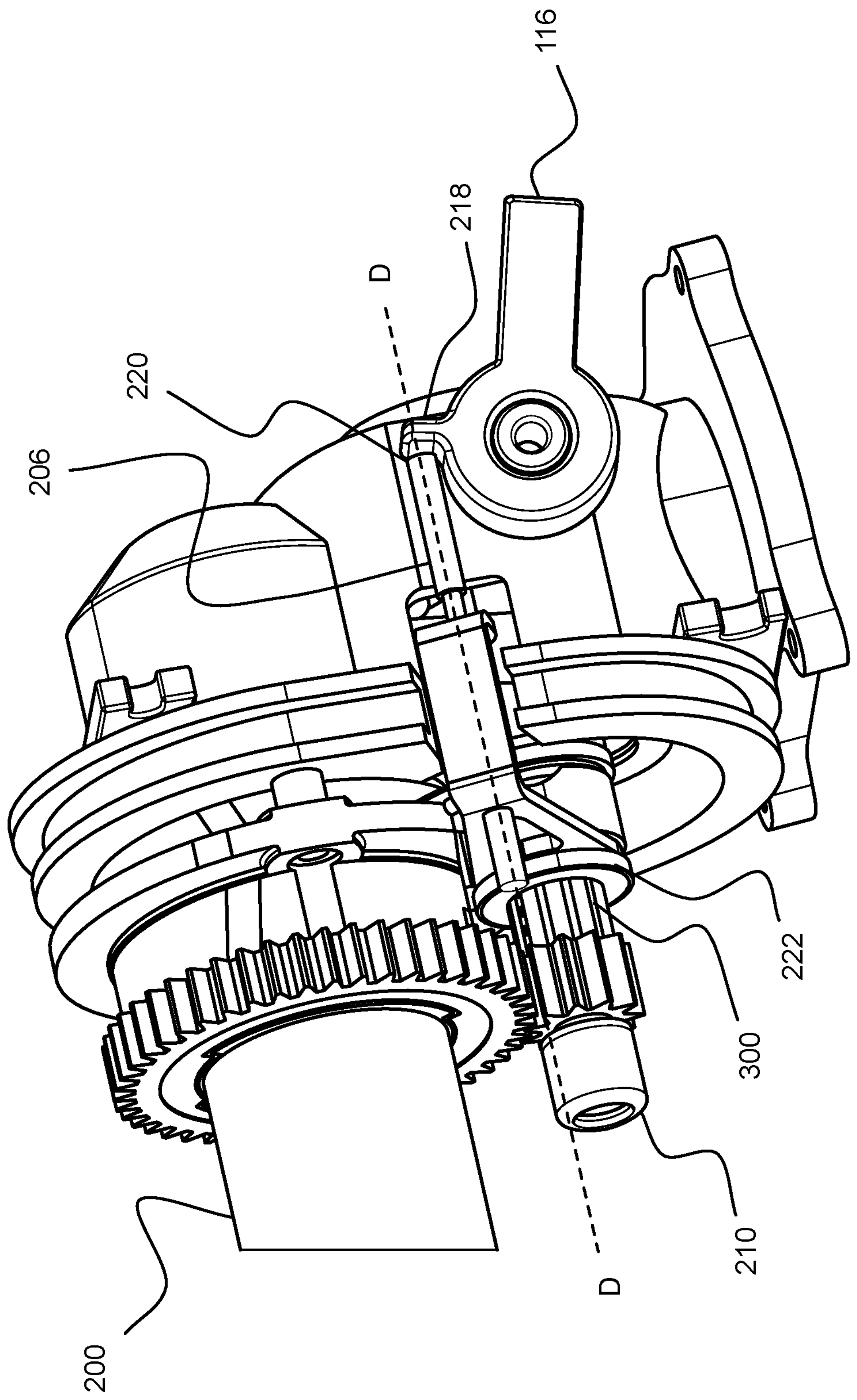
FIG. 3 shows a partial perspective view of a power tool according to an example in a second mode of operation.

Turning to FIG. 3, the mode selection mechanism 204 will be discussed in further detail. FIG. 3 shows a partial perspective view of the hammer drill 100 according to an example in the second mode of operation. When the mode selection actuator 116 is in the second actuator position, the hammer drill 100 is in the second mode of operation e.g. a hammer-drill mode of operation.

As shown in FIG. 3, the mode selection actuator 116 has been moved in to the second actuator position. This causes the projecting tab 218 and the actuating rod 206 to move in a direction along a longitudinal axis D-D of the actuating rod 206. In some examples, the projecting tab 218 is coupled to the end 220 of the actuating rod 206. For example, the end 220 of the actuating rod 206 is coupled to the projecting tab 218 via an articulated joint (not shown). This means that the projecting tab 218 can push and pull the actuating rod 206 when the mode selection actuator 116 moves.

Figure 6:
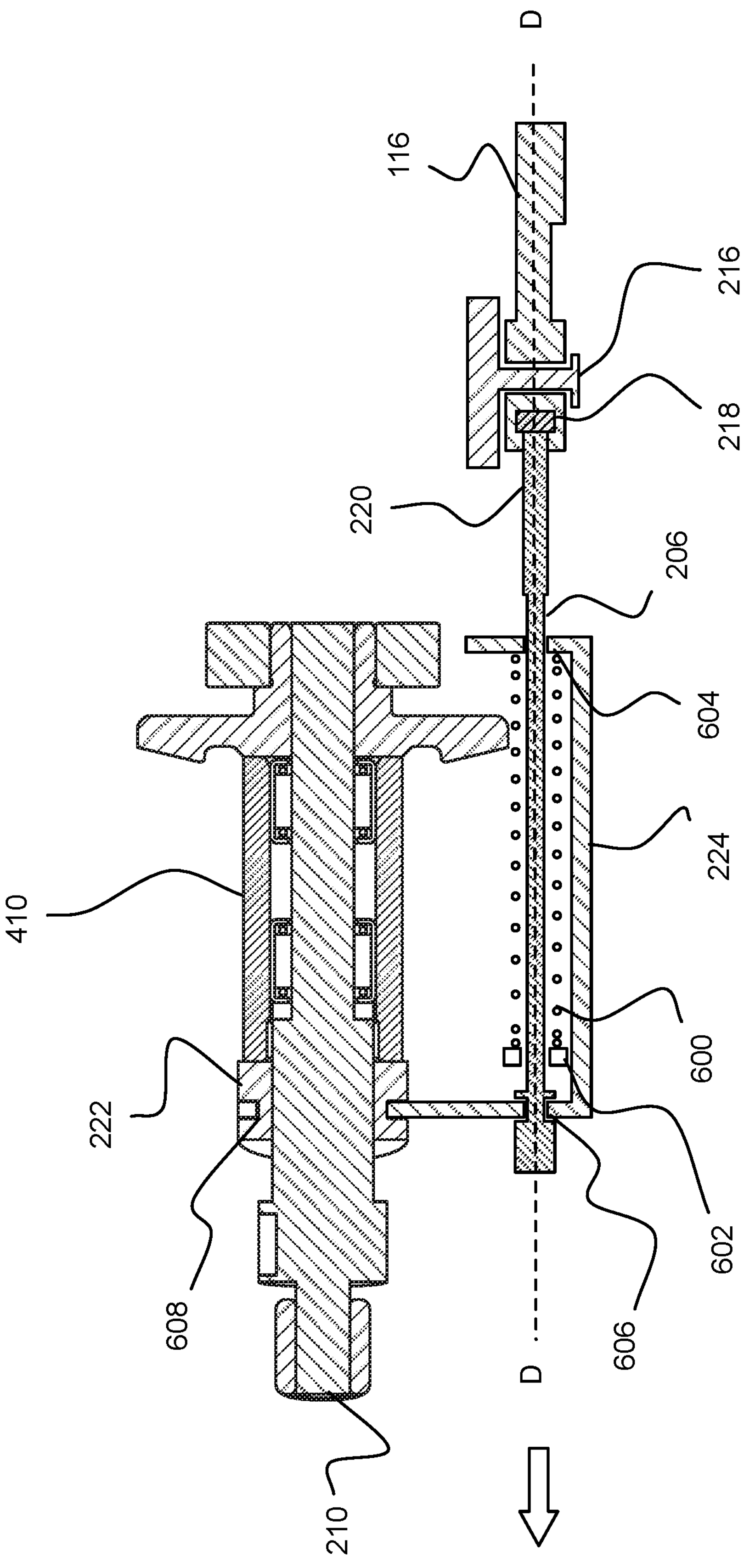
FIG. 6 shows a partial side cross-sectional view of a power tool according to an example in a second mode of operation along the axis B-B.

Alternatively, and as shown in FIG. 3, the projecting tab 218 abuts the end 220 of the actuating rod 206. In this example, the actuating rod 206 is optionally urged towards a position wherein the mode selection actuator 116 is in the second actuator position. In some examples, the actuating rod 206 is urged by a spring 600 as shown in FIG. 6. The spring 600 is seated around the actuating rod 206.

Turning briefly to FIG. 6, the actuating rod 206 will be discussed in further depth. The actuating rod 206 moves between a first rod position and a second rod position corresponding to the first and second modes of operation of the hammer drill 100.

The actuating rod 206 as shown in FIG. 6 is in the second rod position which corresponds to the hammer drill 100 in the second mode of operation. The projecting tab 218 and the actuating rod 206 are arranged to move along the longitudinal axis D-D of the actuating rod 206. If the mode selection actuator 116 is moved into the first actuator position, the projecting tab 218 and the actuating rod 206 move along the axis D-D of the actuating rod 206 in the direction of the arrow. This causes the sliding arm 224 and the engaging collar 222 to move in the same direction as the projecting tab 218 and the actuating rod 206.

In some examples, the longitudinal axis D-D of the actuating rod 206 is substantially parallel to a longitudinal axis E-E of the output shaft 200. In some examples, the sliding arm 224 and the engaging collar 222 are moveable in a direction substantially parallel to a longitudinal axis E-E of the output shaft 200. In some other examples, the longitudinal axis D-D of the actuating rod 206 is inclined at an angle to a longitudinal axis E-E of the output shaft 200. In some examples, the sliding arm 224 and the engaging collar 222 are moveable in a direction inclined at an angle to a longitudinal axis E-E of the output shaft 200.

The actuating rod 206 is mounted on the sliding arm 224 and projects through a first hole 604 and a second hole 606. The shape of the actuating rod 206 is profiled so that the sliding arm 224 is fixed with respect to the actuating rod 206 and the sliding arm 224 moves with the actuating rod 206.

When the projecting tab 218 and the actuating rod 206 move, the spring 600 is compressed between the sliding arm 224 and stop element 602. The stop element 602 is a portion of the gear housing portion 106 and fixed with respect to the mode selection mechanism 204. The stop element 602 can be a projection from the inside surface of gear housing portion 106.

A holding spring 610 is mounted on the actuating rod 206 and urges a felt seal 612 against the housing 102 to prevent dirt ingress at the hole 614 where the actuating rod 206 projects through the housing 102 into the gear housing portion 106. Only a part of the housing 102 has been shown in FIG. 6 for the purposes of clarity.

The spring 600 urges the actuating rod 206 from the first rod position to the second rod position when the projecting tab 218 and the mode selection actuator 116 are moved back into the first actuator position. Accordingly, the actuator rod 206, the engaging collar 222 and the sliding arm 224 are all biased by the spring 600. This means that the projecting tab 218 needs only to rest on the end 220 of the actuating rod 206. In other words, the projecting tab 218 is arranged to push the actuating rod 206 from the second rod position to the first rod position and the spring 600 is arranged to urge the actuating rod 206 from the first rod position back to the second rod position.

Advantageously, the projecting tab 218 and the actuating rod 206 only move along the axis D-D of the actuating rod 206. This means that the mode selection mechanism 204 and the mode selection actuator 116 can be smaller and thinner and the width of the hammer drill 100 can be reduced. The projecting tab 218 remains substantially stationary with respect to the end 220 of the actuating rod 206. This means that there is no sliding engagement between the mode selection actuator 116 and the actuating rod 206. This reduces the wear and maintenance required of the hammer drill 100.

FIG. 3 shows the engaging collar 222 in engagement with the rotating sleeve 410 and rotary drive is transmitted between the gear drive shaft 210 and the rotating sleeve 410. Accordingly, rotary drive is transmitted to both the rotary drive mechanism 408 and the hammer mechanism 406.

The mode selection mechanism 204 will now be described in further detail in respect of FIGS. 4, 5 and 6.

FIG. 4 shows a partial side cross-sectional view of the hammer drill 100 according to an example in a first mode of operation. FIG. 5 shows a partial side cross-sectional view of the hammer drill 100 according to an example in a second mode of operation. FIG. 6 shows a partial side cross-sectional view of the hammer drill 100 according to an example in a second mode of operation along the axis B-B.

The gear drive shaft 210 comprises a plurality of splines 300 on the outer surface. The splines 300 are best shown in FIG. 3. The engaging collar 222 comprises a plurality of reciprocal splines (not shown) on an inner surface of the engaging collar 222 in engagement with the plurality of splines 300 on the gear drive shaft 210. This means that the engaging collar 222 is slidable along the gear drive shaft 210 and can transmit rotary drive from the gear drive shaft 210.

Figure 5:
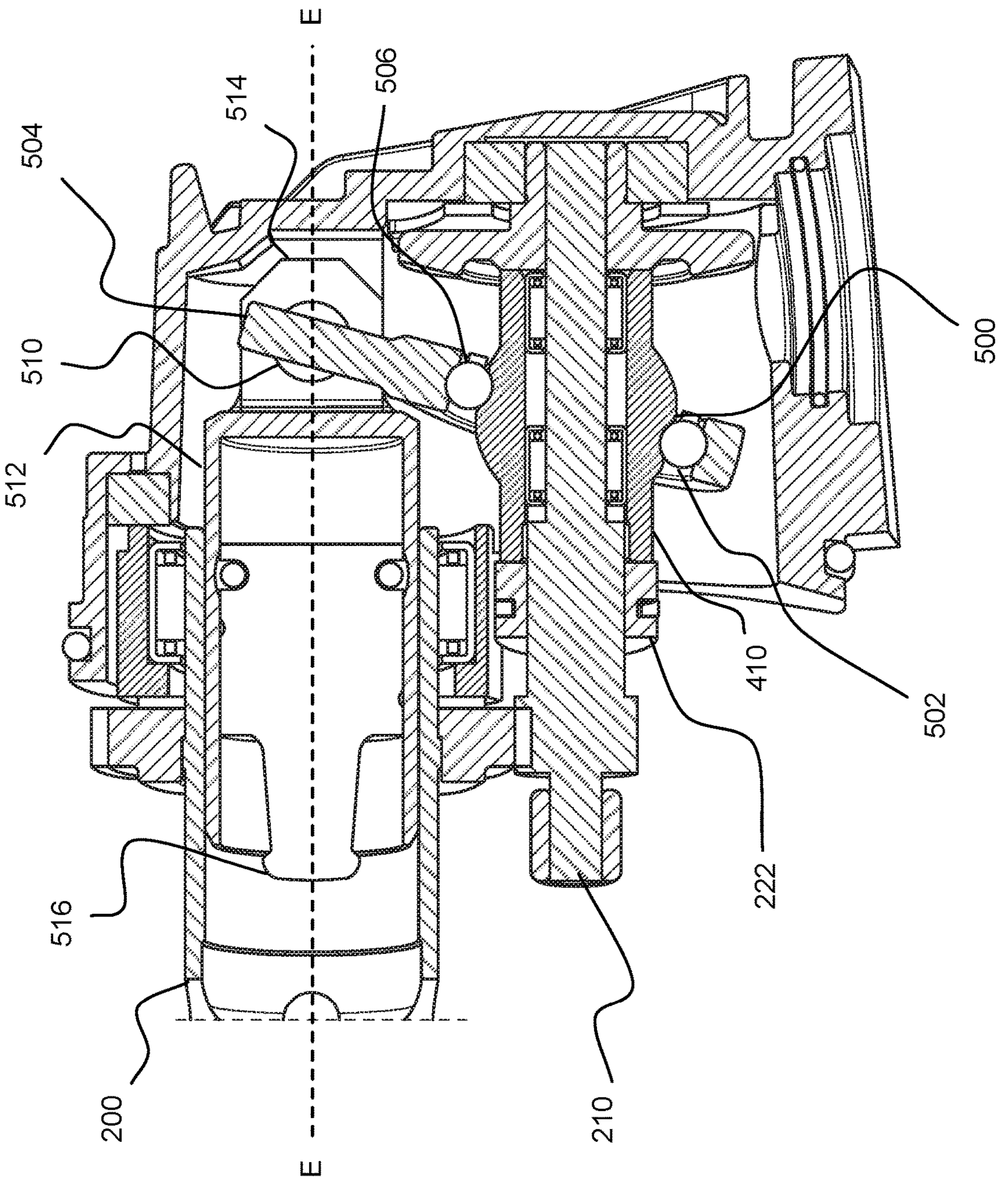
FIG. 5 shows a partial side cross-sectional view of a power tool according to an example in a second mode of operation.

FIG. 5 shows the engaging collar 222 in the second position in which the hammer drill 100 operates in a second operation mode. When the engaging collar 222 is in the second position, the engaging collar 222 is in physical engagement with the rotating sleeve 410 and the gear drive shaft 210. In some examples, the rotating sleeve 410 comprises a plurality of splines (not shown) on the outer surface of the rotating sleeve 410 for engagement with the plurality of reciprocal splines (not shown) on an inner surface of the engaging collar 222. In some other examples, the engaging collar 222 and the rotating sleeve can comprise any mechanism for selective mechanical engagement. For example, the engaging collar 222 can comprises projecting pegs and the rotating sleeve 410 can comprise reciprocal holes (not shown). Alternatively, the engaging collar 222 can comprise a key (not shown) and the rotating sleeve 410 can comprises a reciprocal keyway.

As mentioned above, when the mode selection mechanism 204 is in the second position, the engaging collar 222 couples the gear drive shaft 210 and the rotating sleeve 410 and rotary drive is transmitted therebetween. This causes the hammer mechanism 406 to actuate. The hammer mechanism 406 will now be discussed in reference to FIG. 5.

The hammer mechanism 406 is coupled to the rotating sleeve 410. The rotating sleeve 410 comprises a wobble plate track 500 formed around the outer surface of the rotating sleeve 410 at an angle to the axis of the gear drive shaft 210. A wobble plate ring 502 from which extends a wobble pin 504 is mounted for rotation around the wobble plate track 500 via ball bearings 506. The end of the wobble pin 504 remote from the wobble plate ring 502 is mounted through an aperture in a trunnion 510. The trunnion 510 is pivotally mounted to the rear end of a hollow piston 512 via two apertured arms 514. When the rotating sleeve 410 is rotatably driven about the gear drive shaft 210, the wobble pin 504 reciprocates and drives the hollow piston 512 along the longitudinal axis E-E of the output shaft 200. The hollow piston 512 is reciprocatingly driven by the wobble plate drive and a tool or bit mounted in the tool holder 104 is repeatedly impacted by the hammer piece 516 via the action of the hollow piston 512.

Whilst the second mode of operation as described in FIGS. 5 and 6 describes a hammer mechanism 406 providing impacts on the output shaft 200 in an axial direction of the output shaft E-E, other modes of operation can be implemented. For example, the hammer mechanism 406 can impact the output shaft 200 in a tangential direction to achieve an impact driver type action. Such an arrangement is described in EP30351580 which is incorporated herein by reference.

Figure 7B:
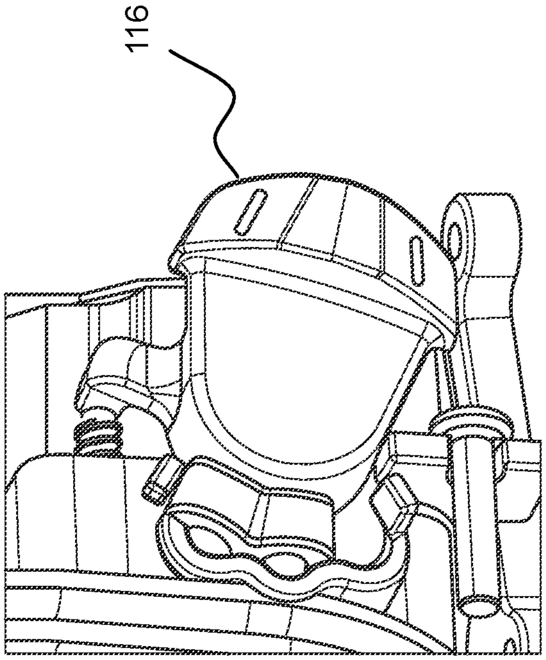

The mode selection actuator 116 will now be discussed in more detail. FIGS. 7*a* and 7*b* show a partial perspective view of the mode selection actuator 116 respectively in the first and second modes of operation.

Optionally, the mode selection actuator 116 comprises at least one spring biased detent engageable with at least one recess on the housing 102. In some examples, the mode selection actuator 116 comprises first and second spring biased ball bearings 702, 704 for engaging in reciprocal indexing recesses 706, 708, 710 in the housing 102. In this way, the first and second actuator positions are indexed by the first and second spring biased ball bearings 702, 704 and the reciprocal indexing recesses 706, 708, 710.

The spring-loaded ball bearings 702, 704 are biased by a sufficiently strong spring (not shown) so that the mode selection actuator 116 remains in place until the user moves the mode selection actuator 116. This means that the user must apply positive force to move the mode selection actuator 116 and the mode selection actuator 116 is harder to accidentally adjust.

In some examples, a single spring-loaded ball bearing 702 is used to hold the mode selection actuator 116 in the first and second actuator positions.

In some other less preferred examples, there is no indexing of the mode selection actuator 116 and frictional forces between the mode selection actuator 116 and the housing 102 keeps the mode selection actuator 116 in position.

Whilst FIGS. 7*a* and 7*b* show only two mode selection actuator 116 positions, further indexing recesses can be provided in the housing within the recess 118 corresponding to other actuator positions. For example, in an alternative example there is a single spring-loaded ball bearing 702 which is arranged to engage with each of the reciprocal indexing recesses 706, 708, 710. In this way, the mode selection actuator 116 as shown in FIGS. 7*a* and 7*b* can also be used for three positions of the mode selection actuator 116.

Figure 8:
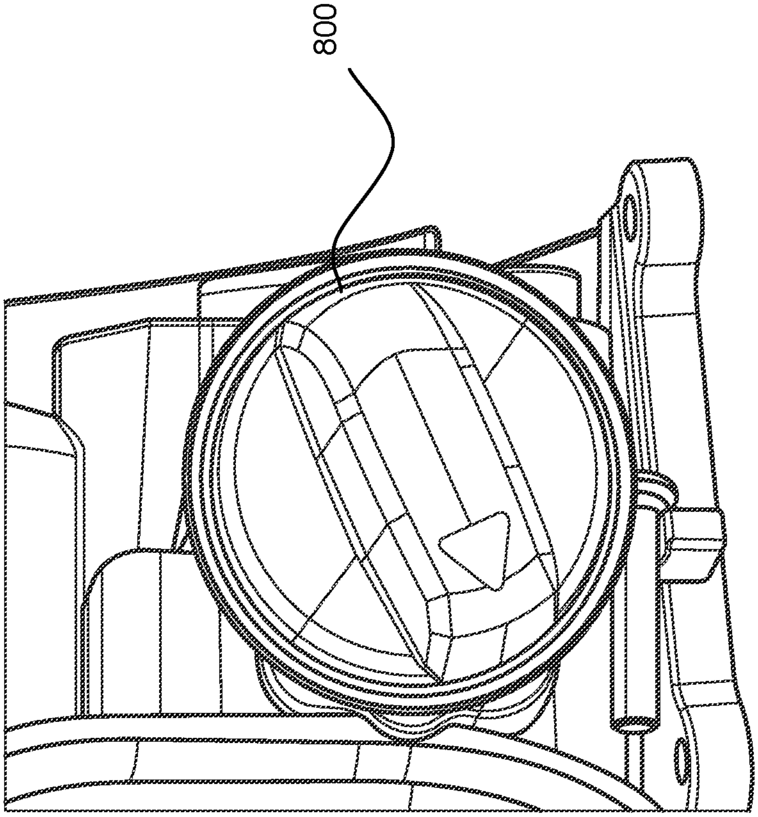
FIG. 8 shows a partial perspective view of a mode selection actuator according to another example.

The mode selection actuator 116 can have a plurality of forms. Another form of the mode selection actuator 800 can be seen in FIG. 8. FIG. 8 shows a partial perspective view of a mode selection actuator 800 according to another example. The mode selection actuator 800 as shown in FIG. 8 comprises an engaging portion 218 such as a projecting tab 218 (not shown in FIG. 8) which is the same as discussed in reference to the previous examples. In this way the mode selection actuator 800 functions in the same way as before. However, the shape of the mode selection actuator 800 is such that the mode selection actuator 800 is a rotatable knob 800 rather than a pivoting lever.

Figure 9:
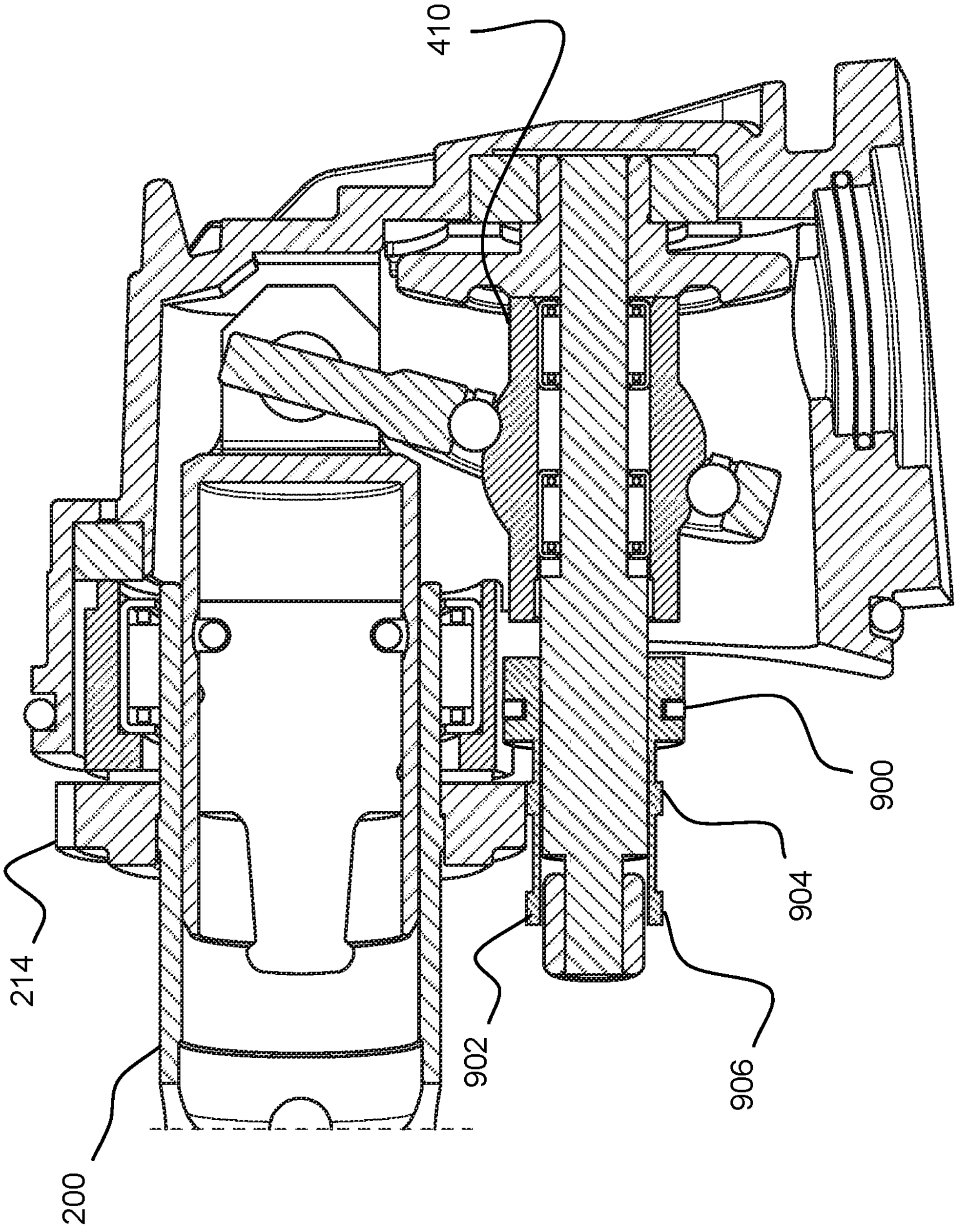
FIG. 9 shows a partial side cross-sectional view of a power tool according to another example in a first mode of operation.
Figure 10:
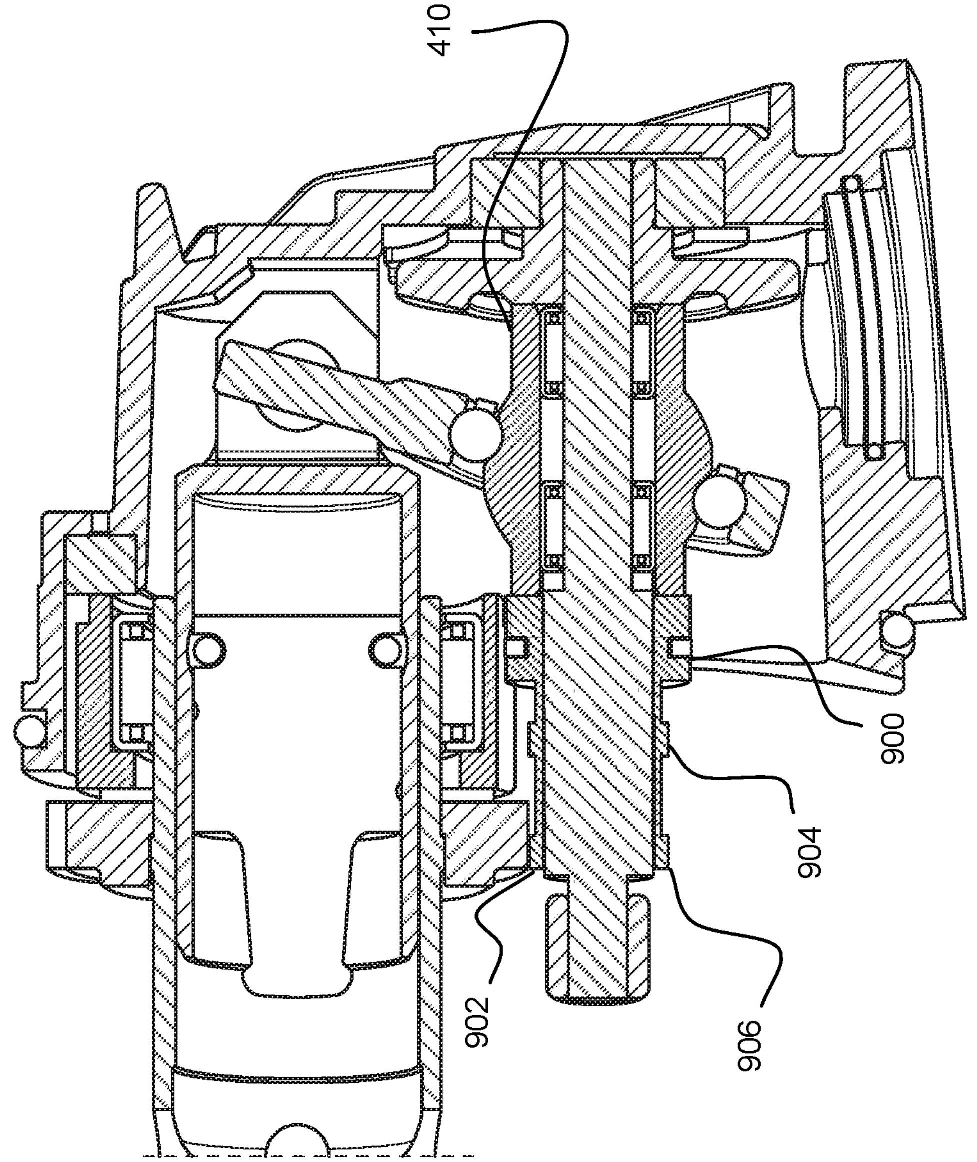
FIG. 10 shows a partial side cross-sectional view of a power tool according to another an example in a second mode of operation.
Figure 11:
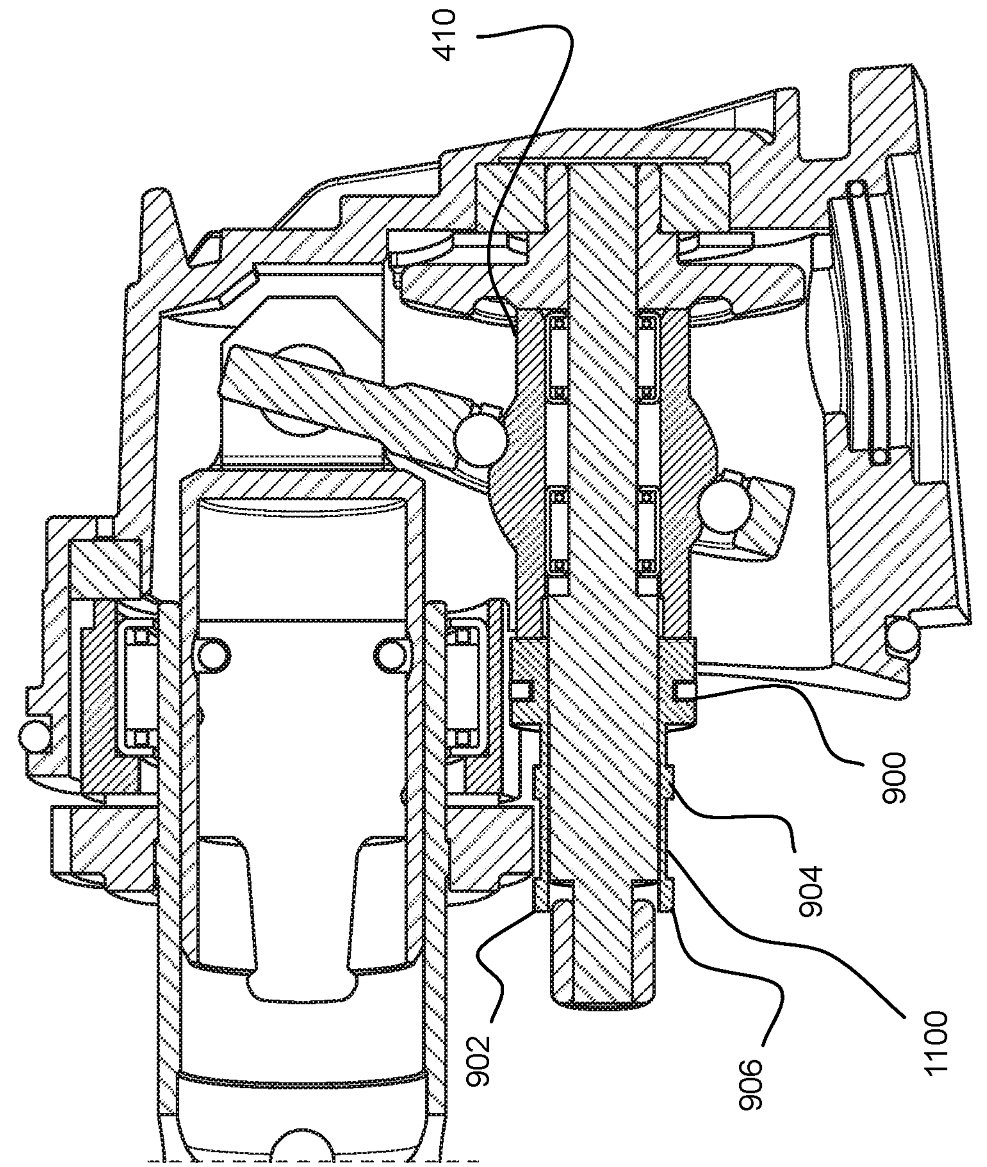
FIG. 11 shows a partial side cross-sectional view of a power tool according to another example in a third mode of operation.

Another example will now be described in reference to FIGS. 9 to 11. FIG. 9 shows a partial side cross-sectional view of a hammer drill 100 according to another example in a first mode of operation. FIG. 10 shows a partial side cross-sectional view of a hammer drill 100 according to another an example in a second mode of operation. FIG. 11 shows a partial side cross-sectional view of a hammer drill 100 according to another example in a third mode of operation.

The examples as shown in FIGS. 9 to 11 is the same with respect to the examples discussed in reference to FIGS. 1 to 8 except that the engaging collar 900 has been modified.

The engaging collar 900 comprises a sleeve 902 and a first sleeve gear 904 and a second sleeve gear 906. In this way, when the engaging collar 900 moves, the first and second sleeve gears 904, 906 also move. Accordingly, the first and second sleeve gears 904, 906 can be selectively engaged with the second gear 214 mounted on the output shaft 200.

In FIG. 9 only the first sleeve gear 904 is in engagement with the second gear 214 mounted on the output shaft 200.

In this way, the arrangement in FIG. 9 only transmits rotary drive to the output shaft 200 e.g. a drill only mode. This is similar to the drill only mode described in reference to the previously examples e.g. as shown in FIG. 4.

In FIG. 10, the engaging collar 900 engages the rotating sleeve 410 in the same way as discussed in reference to FIG. 5. At the same time, the second sleeve gear 906 is engaged with the second gear 214 mounted on the output shaft 200. In this way, the arrangement in FIG. 10 transmits rotary drive to the output shaft 200 and the rotating sleeve 410. e.g. a hammer-drill only mode.

In FIG. 11 the engaging collar 900 only engages the rotating sleeve 410. The engagement of the engaging collar 900 with the rotating sleeve 410 is the same as discussed in reference to FIG. 5. At the same time neither the first nor the second sleeve gears 904, 906 are engaged with the second gear 214 mounted on the output shaft 200. Indeed, the sleeve 902 comprises a low profile portion 1100 with no gear teeth which is aligned with the second gear 214 mounted on the output shaft 200 in the third mode of operation. Accordingly, no rotary drive is transmitted to the output shaft 200 via the second gear 214 mounted on the output shaft 200 in the third mode of operation. In this way, the arrangement in FIG. 11 only transmits rotary drive to the rotating sleeve 410 e.g. a hammer only mode.

In the examples as shown in FIGS. 9 to 11, the mode selection actuator 116 rotates through a greater angle than the examples shown in FIGS. 1 to 8 so that the actuating rod 206 can move further along the longitudinal axis D-D and allow for the selection of three modes of operation. In some examples, the mode selection actuator 116 in the examples shown in FIGS. 9 to 11 is configured to rotate through an angle of approximately 60 degrees. In contrast the mode selection actuator 116 in the examples shown in FIGS. 1 to 8 is configured to rotate through an angle of approximately 30 degrees.

In another embodiment two or more embodiments are combined. Features of one embodiment can be combined with features of other embodiments. Embodiments of the present invention have been discussed with particular reference to the examples illustrated. However, it will be appreciated that variations and modifications may be made to the examples described within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:

a motor having a drive shaft having a drive shaft axis, the motor being mounted in a housing;

an output shaft connectable to a tool and having an output shaft axis substantially perpendicular to the drive shaft axis;

a mode selection mechanism couplable between the drive shaft and the output shaft and arranged to transmit drive therebetween wherein the mode selection mechanism is moveable between at least a first position in which the power tool operates in a first operation mode and a second position in which the power tool operates in a second operation mode;

a mode selection actuator mounted on the housing and arranged to select at least the first position and the second position of the mode selection mechanism, and be pivotable about an axis perpendicular to the output shaft axis and the drive shaft axis; and an actuating rod coupled between the mode selection mechanism and an engaging portion of the mode selection actuator, the engaging portion projecting outwardly from a perimeter of the mode selection actuator, wherein the engaging portion and actuating rod are moveable in a direction along a longitudinal axis of the actuating rod when the mode selection mechanism moves between the first position and the second position.

2. The power tool of claim 1, wherein the engaging portion is a projecting tab arranged to engage an end surface of the actuating rod.

3. The power tool of claim 1, wherein the longitudinal axis of the actuating rod is substantially parallel to a longitudinal axis of the output shaft.

4. The power tool of claim 1, wherein the mode selection mechanism comprises a gear drive shaft arranged to transmit rotation from the drive shaft to the output shaft.

5. The power tool of claim 4, wherein the gear drive shaft comprises a first gear engageable with an output shaft gear and a second gear engageable with a drive shaft gear.

6. The power tool of claim 4, wherein the mode selection mechanism comprises a rotatable sleeve mounted on the gear drive shaft and selectively couplable to the gear drive shaft.

7. The power tool of claim 6, wherein the mode selection mechanism comprises an engaging collar moveable between a first position wherein the engaging collar is engaged with the gear drive shaft and the rotatable sleeve and a second position wherein the engaging collar rotates with respect to the gear drive shaft or the rotatable sleeve.

8. The power tool of claim 7, wherein the gear drive shaft and/or the rotatable sleeve comprise splines engageable with reciprocal splines on the engaging collar.

9. The power tool of claim 7, wherein the mode selection mechanism comprises a sliding arm connected to the engaging collar and slidably engageable with the actuating rod.

10. The power tool of claim 9, wherein the sliding arm and the engaging collar are moveable in a direction substantially parallel to a longitudinal axis of the output shaft when the mode selection mechanism moves between the first position and the second position.

11. The power tool of claim 1, further comprising a gear drive shaft arranged to transmit rotation from the drive shaft to the output shaft, wherein the actuating rod is moveable in a direction substantially parallel to a longitudinal axis of the gear drive shaft when the mode selection mechanism moves between the first position and the second position.

12. The power tool of claim 1, wherein the actuating rod is biased towards a position where the mode selection mechanism is in the second position.

13. The power tool of claim 1, wherein the power tool comprises a reciprocating hammer arranged to strike a surface of the output shaft wherein the reciprocating hammer is driven by a rotatable sleeve mounted on the gear drive shaft.

14. The power tool of claim 1, wherein the power tool is a hammer drill, the first operation mode is a drill only mode, and the second operation mode is a hammer-drill mode.

15. The power tool of claim 1, wherein the mode selection mechanism is moveable to a third position in which the power tool operates in a third operation mode.

16. The power tool of claim 1, wherein the mode selection actuator is a pivotable lever, a rotatable knob or a button.

17. The power tool of claim 1, wherein the mode selection actuator comprises at least one spring biased detent engageable with at least one recess on the housing, wherein the housing comprises a first recess and a second recess respectively corresponding to the position of the mode selection actuator when the mode selection mechanism is in the first position and in the second position.

18. A mode selection assembly for a power tool comprising:

a mode selection mechanism couplable between a drive shaft of a motor having a drive shaft axis and an output shaft connectable to a tool, the output shaft having an output shaft axis substantially perpendicular to the drive shaft axis, the mode selection mechanism arranged to transmit drive between the drive shaft and the output shaft, wherein the mode selection mechanism is moveable between at least a first position in which the power tool operates in a first operation mode and a second position in which the power tool operates in a second operation mode;

a mode selection actuator mountable on a housing of the power tool and arranged to select at least the first position and the second position of the mode selection mechanism, and be pivotable about an axis perpendicular to the output shaft axis and the drive shaft axis; and an actuating rod coupled between the mode selection mechanism and an engaging portion of the mode selection actuator, the engaging portion projecting outwardly from a perimeter of the mode selection actuator, wherein the engaging portion and actuating rod are moveable in a direction along a longitudinal axis of the actuating rod when the mode selection mechanism moves between the first position and the second position.

19. A power tool comprising:

a motor having a drive shaft having a drive shaft axis, the motor being mounted in a housing;

an output shaft connectable to a tool, the output shaft having an output shaft axis substantially perpendicular to the drive shaft axis; and a mode selection mechanism couplable between the drive shaft and the output shaft and arranged to transmit drive therebetween wherein the mode selection mechanism is moveable between at least a first position in which the power tool operates in a first operation mode and a second position in which the power tool operates in a second operation mode;

a mode selection actuator mountable on a housing of the power tool and arranged to select at least the first position and the second position of the mode selection mechanism, and be pivotable about an axis perpendicular to the output shaft axis and the drive shaft axis; and an actuating rod having a first end coupled to the mode selection mechanism wherein the actuating rod is moveable in a direction along a longitudinal axis of the actuating rod when the mode selection mechanism moves between the first position and the second position;

wherein a second end of the actuating rod projects into a recess in the housing arranged to receive a mode selection actuator and the second end of the actuating rod is engageable with an engaging portion of the mode selection actuator when the mode selection mechanism moves between the first position and the second position, and wherein the engaging portion projects outwardly from a perimeter of the mode selection actuator.

20. The power tool of claim 19, wherein the recess is arranged to receive one of a plurality of mode selection actuators.

21. The power tool of claim 1, wherein the engaging portion is a projecting tab arranged to engage a longitudinal end surface of the actuating rod.

* * * * *